US006792857B2

(12) United States Patent
Sameit et al.

(10) Patent No.: US 6,792,857 B2
(45) Date of Patent: Sep. 21, 2004

(54) APPARATUS AND METHOD FOR STORING SLEEVES FOR ROTARY PRINTING MACHINES

(75) Inventors: Christian Sameit, Augsburg (DE); Georg Schmid, Neusäss (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 118 days.

(21) Appl. No.: 09/973,366

(22) Filed: Oct. 9, 2001

(65) Prior Publication Data

US 2002/0056392 A1 May 16, 2002

(30) Foreign Application Priority Data

Oct. 9, 2000 (DE) ......................................... 100 50 097

(51) Int. Cl.⁷ .......................... B41F 13/10; B41L 47/14
(52) U.S. Cl. ....................... 101/375; 101/376; 101/379; 101/477; 364/424.07; 364/478; 425/909
(58) Field of Search ................................. 101/375, 376, 101/379, 477; 425/909; 364/478, 424.07

(56) References Cited

U.S. PATENT DOCUMENTS

| 5,113,349 A | 5/1992 | Nakamura et al. | .......... 364/478 |
|---|---|---|---|
| 5,260,694 A | * 11/1993 | Remahl | ....................... 340/674 |
| 5,323,704 A | 6/1994 | Fraczek | ....................... 101/375 |
| 5,875,434 A | * 2/1999 | Matsuoka et al. | ............. 705/28 |
| 5,877,962 A | * 3/1999 | Radcliffe | ................ 364/478.03 |
| 6,101,944 A | * 8/2000 | Schmid et al. | .............. 101/467 |
| 6,128,549 A | * 10/2000 | Swartz et al. | ................ 700/225 |
| 6,148,725 A | 11/2000 | Knauer et al. | ............... 101/217 |

FOREIGN PATENT DOCUMENTS

| DE | 196 14 514 | 10/1997 | ............ B65G/1/16 |
|---|---|---|---|
| DE | 297 20 928 | 4/1998 | |
| EP | 0 572 967 | 12/1993 | ........... B65G/1/137 |
| EP | 1 024 096 | 8/2000 | ........... B65G/1/137 |

\* cited by examiner

Primary Examiner—Daniel J. Colilla
Assistant Examiner—Marvin P. Crenshaw
(74) Attorney, Agent, or Firm—Cohen, Pontani, Lieberman & Pavane

(57) ABSTRACT

An apparatus and method for storing rubber-covered cylinder sleeves for offset printing for rotary printing machines permits an identified rubber-covered cylinder sleeve to be found easily. The apparatus is equipped with an electronic memory device into which, for each rubber-covered cylinder sleeve, characteristic data can be entered and stored. As the rubber-covered cylinder sleeve is introduced into a storage, the characteristic data from the rubber-covered cylinder sleeve are read into the memory device, and the rubber-covered cylinder sleeve can be removed from the storage apparatus in accordance with predefined data.

35 Claims, 7 Drawing Sheets

APPARATUS AND METHOD FOR STORING SLEEVES FOR ROTARY PRINTING MACHINES

BACKGROUND OF THE INVENTION

1. Field of the Invention

The invention relates to an apparatus for storing sleeves for rotary printing machines and to a method for storing sleeves for rotary printing machines.

2. Description of the Related Art

As a result of the increasingly important use of sleeves for rotary printing machines, in particular of rubber-covered cylinder sleeves for rotary offset printing machines, the sleeves are identified and registered by data-based means.

DE 297 20 298 U1 discloses a printing sleeve for flexographic printing machines in whose envelope surface an electronic memory module configured as a transponder is introduced for the purpose of identification.

Using this memory module, an electronically stored identifier individual to the sleeve is possible, this identifier being, for example, a consecutive serial number, manufacturing data, dimensions and materials of the sleeve and/or the pattern applied to the sleeve by the customer or information about the end customer.

Furthermore, the abovementioned information in the electronic memory module can, at least to some extent, be over-written and updated.

This information is over-written and interrogated with the machine at a standstill or on printing sleeves taken out of the machine.

In printing works there is a large number of identified sleeves, which are registered by data-based means and, following one or more printing operations, are put into storage again.

In order to minimize costs, there is in printing works a demand to use sleeves, in particular rubber-covered cylinder sleeves, which have already been used and are suitable for the respective printing operation. However, an exact search for such a "used" sleeve, that is to say one already used once or repeatedly, which is suitable for the printing operation in the store is tiresome and time-consuming.

SUMMARY OF THE INVENTION

It is an object of the invention to provide a system for managing sleeves for rotary printing machines which permits a simple search for an identified sleeve designed as a rubber-covered cylinder sleeve.

According to the invention, the system includes a storage apparatus for storing the sleeves when not in use in the printing machine; a main electronic memory device into which characteristic data for each sleeve can be entered, stored, and managed; means for introducing the sleeves into the storage apparatus; means for reading the characteristic data into the memory device as one of the sleeves is introduced into the storage apparatus; and means for removing one of the sleeves from the storage apparatus in accordance with predefined data and the characteristic data.

A significant advantage is that, by using the system, the use of rubber-covered cylinder sleeves can be optimized. As a result of the specific use, a printing works will always have a plurality of sets of rubber-covered cylinder sleeves in use, so that the specific use of rubber-covered cylinder sleeves, in particular in the case of more than one printing machine, is ensured by means of the apparatus.

Furthermore, the organized stock-keeping of rubber-covered cylinder sleeves is provided by the apparatus.

The apparatus for storing rubber-covered cylinder sleeves is equipped with a memory device.

In this memory device, information and characteristic data to be managed are stored both permanently and also for a short time.

Permanent in the memory device are information and characteristic data such as the identity number of the rubber-covered cylinder sleeve, the description of the rubber-covered cylinder sleeve, test data, manufacturing data, delivery data and the date of first and last use. At the end of the service life, the reason for failure and the total number of rolling revolutions are stored. The test data are to be understood to be physical and geometric test values, such as stiffness values, total thickness and material thickness of the rubber-covered cylinder sleeve, and also diameter and roughness information.

In the memory device for a short time are the information and characteristic data such as production history information and damage status. The damage status means the type and the extent of damage to the rubber-covered cylinder sleeve.

The aforementioned production history information is, for example, data and information about the number of wash cycles, web width, grammage, net number of copies, average rotational speed.

Optimum use of the system according to the invention for managing rubber-covered cylinder sleeves is achieved in particular when rubber-covered cylinder sleeves equipped with memory devices are used. A rubber-covered cylinder sleeve of this type with a memory device is described in the following description of the examples.

The significant factor is that when rubber-covered cylinder sleeves with a memory device are used, it is possible to store, over-write and interrogate characteristic data, these are the information and data identifying the rubber-covered cylinder sleeve individually during the printing operation by using data transmission devices in a rotary printing machine or via a data transmission device connected to the memory device integrated in the storage apparatus.

Likewise, the information and characteristic data to be managed permanently and for a short time and already mentioned above can be stored in the memory device of the rubber-covered cylinder sleeve.

It is significant that additional information, such as function-relevant characteristics, the number of rolling revolutions, production information, the times of the construction and the respective uses and/or the decommissioning, the cause of the failure, reusability, etc., can be applied to the rubber-covered cylinder sleeve directly in the form of electronic characteristic data. Thus, this aforementioned information can be transmitted to the printing machine and/or to the apparatus for storing rubber-covered cylinder sleeves via the memory device of the respective rubber-covered cylinder sleeve.

By means of these characteristic data, it is possible to determine the causes of failure and, in this way, a basis for the assessment of the individual fabrication methods or other manufacturing data is made possible.

A further significant advantage is that, by means of these characteristic data, statements about the service life or the behavior of a rubber-covered cylinder sleeve can be made during its running in one or more printing machines, that is to say over the entire period of the use of the rubber-covered cylinder sleeve in the printing works.

Thus, by means of the information and characteristic data stored both in the memory device of the apparatus according to the invention, and the information and characteristic data applied to the memory device of the rubber-covered cylinder sleeve, the preconditions are provided for the cost-aware use of rubber-covered cylinder sleeves, for example the management and the handling of the rubber-covered cylinder sleeve, that is to say relating to the data-based management and the organized stock-keeping of the rubber-covered cylinder sleeve.

Since no adequate identification is possible on the inner side of the rubber-covered cylinder sleeve, on account of the abrasion, nor on the outer side of the rubber-covered cylinder sleeve, because of the contamination by ink, use is advantageously made of a non-contacting reading and writing method both in the printing machine and in the apparatus for storing rubber-covered cylinder sleeves.

It is significant that the electronic memory device belonging to the rubber-covered cylinder sleeve is configured, for example, as a transponder. However, the electronic memory device can also be, for example, a magnetic strip, a memory chip or the like.

It is advantageous that the transponder or any other memory device can also be fitted and arranged subsequently on rubber-covered cylinder sleeves that are already present at a customer's premises.

In this case, the transponder is not necessarily arranged on the rubber-coated area of the support sleeve. The transponder can, for example, be arranged at the ends of the rubber layer, the transponder being adhesively bonded on using a seal designed as an adhesive and which is used to seal the ends of the rubber layer. The transponder or any other memory device can be fitted at any desired location of the rubber-covered cylinder sleeve, it being possible for the transponder to be fixed to the rubber-covered cylinder sleeve by a fixing means designed as an adhesive tape. Advantageously, the transponder or the memory device can be designed to be self-adhesive or self-fixing.

Thus, adhesive bonding of the transponder or any other memory device in the printing works is possible.

The transponder or the memory device can (not specifically illustrated) also be embedded in the metal layer of the support sleeve of the rubber-covered cylinder sleeve or arranged and/or fixed on this metal layer.

It is also possible for an additional element or additional means or an extension of the rubber-covered cylinder sleeve to be arranged and fixed on the rubber-covered cylinder sleeve, on which the transponder or the memory device can be arranged and/or fixed.

In order not to cause any impairment to the printed image, the transponder is provided with a low overall height. This overall height lies in a range between 0.001 mm and 2.0 mm.

The transponder is advantageously not placed on the surface of the rubber-covered cylinder sleeve but let into the rubber layer or structure of the rubber-covered cylinder sleeve, that is to say for example is surrounded on all sides by the rubber layer, so that optimum protection for the memory device, configured as a transponder, is ensured.

The transponder can also be arranged within a polymer matrix which, for example, is arranged laterally on the rubber-covered cylinder sleeve and/or let into the structure of the rubber-covered cylinder sleeve, that is to say for example is surrounded on all sides by the rubber layer, so that optimum protection for the memory device, configured as a transponder, is ensured.

The transponder can also be placed on the support sleeve or let into or embedded in the support sleeve, the support sleeve here consisting of polymers or composite materials, for example fibrous composite materials such as carbon fibre reinforced plastics (CRP).

The transponder is preferably introduced or fitted in the marginal area of the rubber-covered cylinder sleeve and in this way can be read and also written both with a data transmission device arranged in a stationary manner in the printing machine or in the apparatus according to the invention and configured as a data reader or a data exchange device, and also by a data exchange device designed as a hand-held device.

The marginal area is more suitable than the remaining locations on the rubber-covered cylinder sleeve, in particular the rubber layer, since no pressure occurs here and, in this way, the transponder is not so highly stressed mechanically as a result of external influences. However, the use in the marginal area is not absolutely necessary.

It is advantageous that the memory device arranged in the rubber-covered cylinder sleeve causes neither any widening of the outer side nor any widening of the inner side of the rubber-covered cylinder sleeve, the rubber-covered cylinder sleeve therefore being configured so as to be free of elevations so that the precision of the rubber-covered cylinder sleeve with regard to its handleability and also with regard to the printed image that can be achieved is not impaired.

It is significant that, both in all printing units of a printing machine and in the apparatus for storing rubber-covered cylinder sleeves, a stationary data reader or data exchange device is operated, and these data readers or data exchange devices are connected to the central machine control system or to a computing and memory unit, as a result of which, for each printing machine and the respective apparatus for storing rubber-covered cylinder sleeves, the management both of these rubber-covered cylinder sleeves and of the information and characteristic data identifying these rubber-covered cylinder sleeves is then made easier.

It is significant that, by means of the memory devices used, the characteristic data about a rubber-covered cylinder sleeve can be detected and updated satisfactorily at any time.

This therefore permits the spontaneous calling of and access to all the data which are important for a production sequence and refer to the rubber-covered cylinder sleeve, such as characteristic data, operating data and printing machine data.

It is significant that, by means of the memory devices used on the rubber-covered cylinder sleeves, the identity, for example in the form of an identity number stored on the memory device, and/or characteristic data about the rubber-covered cylinder sleeve can be detected satisfactorily at any time.

This therefore permits the spontaneous calling of and access to all the information and data which are important for a production sequence and refer to the rubber-covered cylinder sleeve, in particular characteristic data, it being possible for the data stored in the memory devices and identifying the rubber-covered cylinder sleeve to be updated continuously during the production sequence by the printing works, for example from the calculations by the computing and memory devices, the control station or the central computer of the printing machine.

Furthermore, by means of the interaction of the memory device in the rubber-covered cylinder sleeve and the memory device of the apparatus according to the invention, advantages also result in the stock-keeping and manufacture of rubber-covered cylinder sleeves, since each rubber-covered cylinder sleeve continuously carries with it its "passport" defined by the characteristic data, and these characteristic data are updated continuously in the memory device of the rubber-covered cylinder sleeve during printing use.

In addition, by means of the interaction of the memory device in the rubber-covered cylinder sleeve and the memory device of the apparatus according to the invention, advantages result in the stock-keeping and manufacture of rubber-covered cylinder sleeves, since each rubber-covered cylinder sleeve continuously carries with it its "passport" defined by the characteristic data, and these characteristic data are updated continuously in the computing and memory devices of the rotary printing machine and in the computing and memory device of the storage apparatus during the printing use of the rubber-covered cylinder sleeve.

The information and characteristic data at all times support the handling and the management of the rubber-covered cylinder sleeve in the area of logistics, for example in the goods inward area and in stock-keeping, in the area of the use of the rubber-covered cylinder sleeve, for example the selection or determining the use of the rubber-covered cylinder sleeve for specific production and production capability, and in the areas of the analysis of the service life of a rubber-covered cylinder sleeve and release of the rubber-covered cylinder sleeve for disposal.

It should be mentioned that, by means of the information and characteristic data stored in the apparatus for storing rubber-covered cylinder sleeves, ordering can be initiated in an automated way, if required, via the rubber-covered cylinder sleeves to be managed.

During the entire service life of the rubber-covered cylinder sleeve, the memory device arranged in the rubber-covered cylinder sleeve supplies to the storage apparatus the necessary information for the optimum utilization of the rubber-covered cylinder sleeves to be managed and to be provided for print jobs, and perfectly fulfils both the requirement to provide data for data to be read, and the requirement for data exchange and data storage without impairment of the print quality.

It is significant that cost savings are made possible, in that faults during the printing are avoided, and therefore an increase and improvement in the print quality are achieved. Going beyond this cost saving, an increase in the useful life of rubber-covered cylinder sleeves is also achieved via the automation of the storage and provision of the rubber-covered cylinder sleeves, as a result of which in turn further cost savings can be realized.

It is worth mentioning that, by means of the system, costs, in particular personnel costs, are saved, since it is no longer the printer operating the printing machine but the storage apparatus which searches for and provides a rubber-covered cylinder sleeve suitable for the respective print job, in an automated manner.

By means of the system according to the invention, in interaction with the rubber-covered cylinder sleeves, the printing machine and the central machine control system, statements can be made about the service life and the quality of the rubber-covered cylinder sleeves.

Furthermore, it is advantageous that, via the aforementioned information and characteristic data flowing into the machine control system and/or into the memory device of the apparatus for storing rubber-covered cylinder sleeves, statistics about the rubber-covered cylinder sleeves managed or in printing operation can be compiled. By means of these statistics, the probable failure of the respective rubber-covered cylinder sleeve can be calculated in terms of time, as a result of which, considered overall, an increase in the useful life of the rubber-covered cylinder sleeves can be achieved.

It is advantageous that the printer operating the printing machine is not hampered in the production process by the automated data processing and the automated data exchange via the memory device arranged in the rubber-covered cylinder sleeve.

It is advantageous that the printer operating the printing machine is not hampered in the production process by the automated data processing and the automated data exchange between the computing and memory devices of the overall rotary printing machine system and the apparatus for storing rubber-covered cylinder sleeves.

The apparatus according to the invention is intended not to be restricted just to the use in the case of rubber-covered cylinder sleeves with a memory device. The apparatus can also be used for storing rubber-covered cylinder sleeves which have their description and/or characteristic data burned in on the inner side or any other type of labelling or identification, for example in the form of a bar code, which is arranged on the surface or on one of the ends of the rubber-covered cylinder sleeve.

For this purpose, specific data readers matched to the respective identifier are used to read the data out.

If identifiers are used which cannot be read or detected by any mechanical data reader and/or data exchange device, then input devices are arranged on respective printing units and on the apparatus. Using the input devices, the printer intended to operate the printing machine can manually enter the identifier applied to the rubber-covered cylinder sleeve.

As a result, there is the possibility that the apparatus for storing rubber-covered cylinder sleeves can also be used for rubber-covered cylinder sleeves which are not yet identified in any form. Thus, the advantages of the apparatus can be applied and utilized even in the case of rubber-covered cylinder sleeves not yet identified in any form.

The apparatus according to the invention provides intelligent storage of rubber-covered cylinder sleeves which by including both the interface for manufacturing rubber-covered cylinder sleeves and the interface of the use of the rubber-covered cylinder sleeve permits statistics relating to the time-related determination of the failure of the respective rubber-covered cylinder sleeve.

Special mention should be made of the fact that the computing and/or memory device of the storage apparatus is equipped with an interface which can be tapped into from an external location, it being possible, via this interface, for characteristic data and information about the respective rubber-covered cylinder sleeve and the data and information about the production sequence, the conditions of use and process data about the respective printing machine and/or the respective printing unit to be called up from an external location, and for new data and information to be transmitted.

Thus, the data, for example manufacturing data and information produced individually during the manufacture, about a new rubber-covered cylinder sleeve can be transmitted from the rubber-covered cylinder sleeve manufacturer, via the externally accessible interface, into the computing and/or memory device of the storage apparatus, and stored there.

For the rubber-covered cylinder manufacturer and the printing machine manufacturer, the externally accessible interface results in the advantage that the data and information to be stored and managed in the computer and/or memory device of the storage apparatus, relating to the rubber-covered cylinder sleeves, the production data and the machine data, provide the respective manufacturer with conclusions about the quality, about possible or real causes of failure and about the behavior in production use of his products.

On the basis of these data and information transmitted to him the manufacturer is thus in a position to carry out quality improvements on the printing machine, the printing unit or the rubber-covered cylinder sleeve.

The manufacturer can set up a central database, the information and characteristic data stored and managed in the database being called up continuously, by means of the interface externally accessible to the manufacturer, via the aforementioned data stored and saved at the customers in the computing and memory devices of the individual apparatus for storing rubber-covered cylinder sleeves, and therefore the database contents consisting of these data being continually updated.

An apparatus of this type can also be referred to as a sleeve management system or printing sleeve management system or rubber-covered cylinder sleeve management system.

The invention also relates to a method of managing rubber-covered cylinder sleeves for a printing machine, according to which it is made easy to find an identified rubber-covered cylinder sleeve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
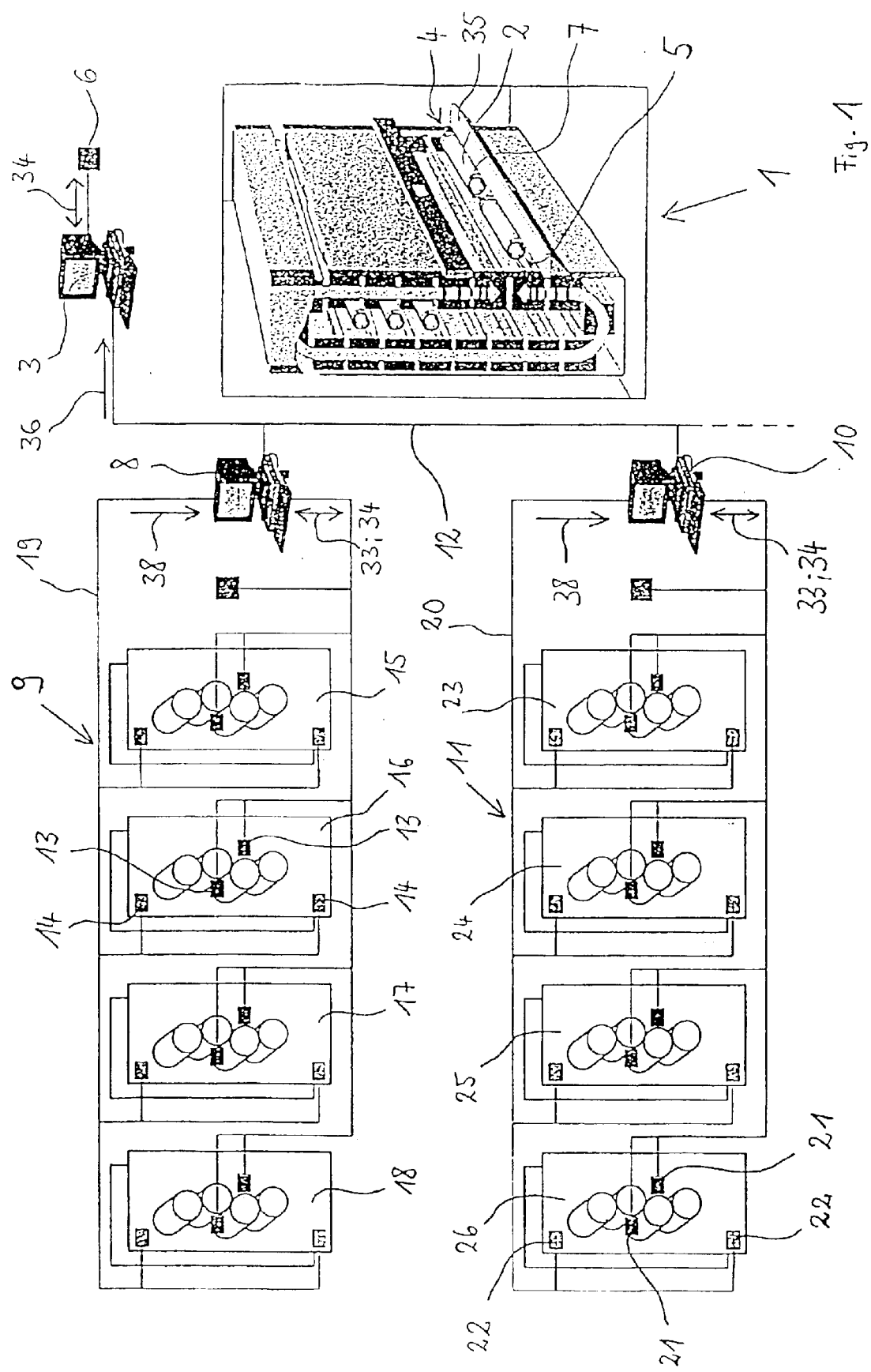
FIG. 1 shows an apparatus for storing and removing rubber-covered cylinder sleeves having a memory device according to the invention arranged on the rubber-covered cylinder sleeve.

FIG. 1 shows an apparatus 1 for storing rubber-covered cylinder sleeves 2, which is connected to a memory device 3.

The apparatus 1 is designed, for example, as a magazine-like or paternoster-like store or high-rack store. The apparatus 1 has a large number of storage spaces 5, which are arranged one behind another, one above another and/or one beside another in the apparatus 1, it being possible for the respective storage space 5 to be brought to a removal and storage position 4. Data exchange devices 6 are fitted in a stationary manner to the apparatus 1 in the area of the removal and storage position 4.

Using these data exchange devices 6, memory devices 7 located on the rubber-covered cylinder sleeves 2 may be read and written.

The memory device 7 is configured as a transponder. Although not specifically illustrated, the memory device 7 can alternatively also be a magnetic strip, a memory chip or the like.

The memory device 3 of the apparatus 1 has a data-exchange connection to a computing and memory device 8 of a first printing machine 9 and to a computing and memory device 10 of a further printing machine 11. Any desired number of memory devices and printing machines can have a data-exchange connection via data lines 12 to the memory device 3 of the apparatus 1.

The computing and memory device 8 of the printing machine 9 is connected via data lines 19 to data exchange devices 13 and counter outputs 14 of individual printing units 15; 16; 17; 18 of the printing machine 9.

The computing and memory device 10 of the printing machine 11 is connected via data lines 20 to data exchange devices 21 and counter outputs 22 of individual printing units 23; 24; 25; 26 of the printing machine 11.

The computing and memory devices 8; 10 may be a control station, a machine control system or a central computer of the printing machine 9; 11. Alternatively, the memory device 3 of the apparatus 1 can be integrated into at least one of the computing and memory devices 8; 10 or replaced by at least one of the computing and memory devices 8; 10.

At the removal and storage position 4 of the apparatus 1, a device 39 (FIG. 2) can be arranged for identifying 39 the rubber-covered cylinder sleeves 2 to be removed from store. Using this identification device 39, it is possible, for example, to apply a label, a description, a code or an imprint to the rubber-covered cylinder sleeve 2 to be removed from store. In this way, by using the identification device 39, a description for the printing unit predetermined for the rubber-covered cylinder sleeve can be applied to the rubber-covered cylinder sleeve 2 irrespective of the memory device 7. With the aid of this description it is made easier for the printer operating the printing machine to find the printing unit.

Figure 3:
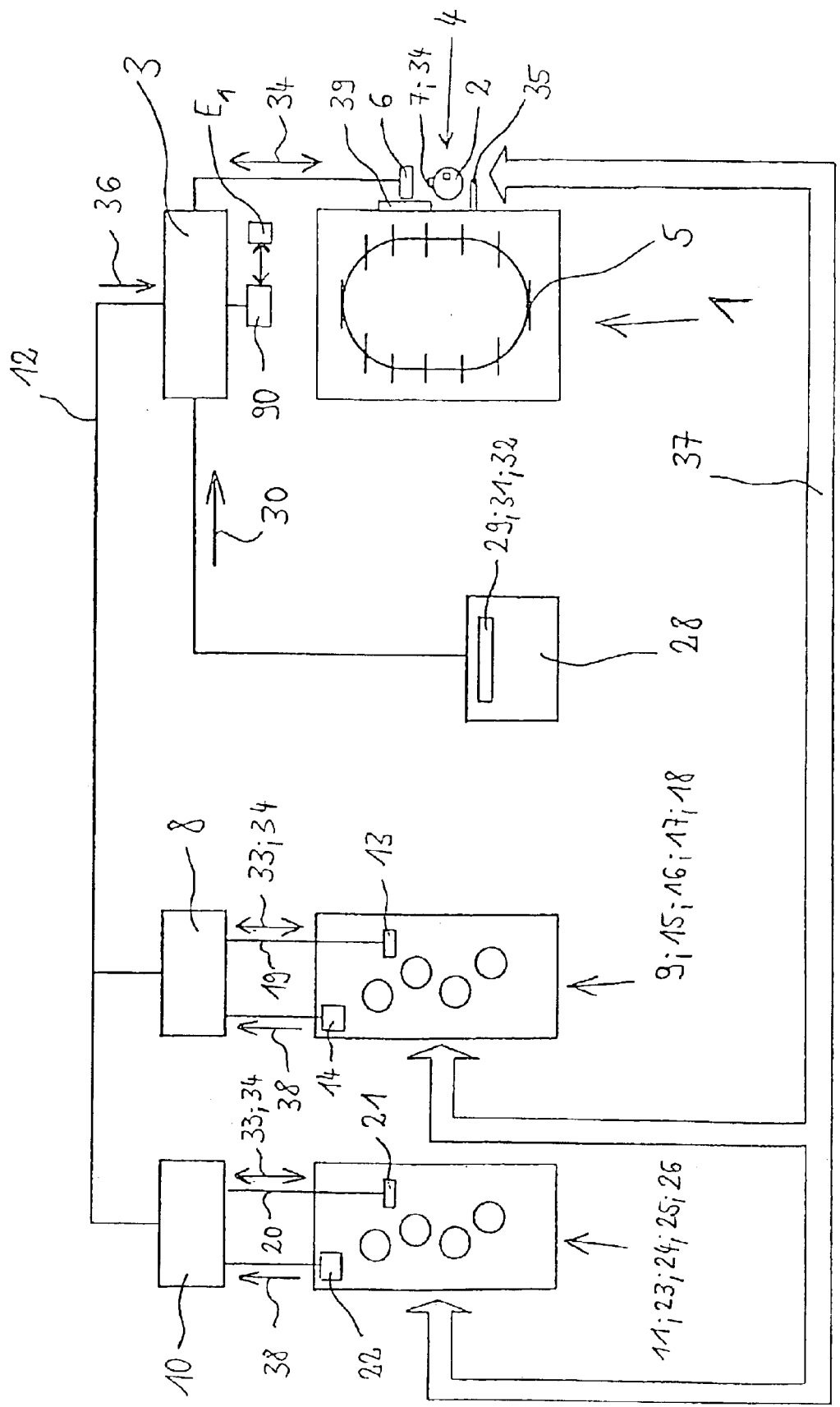
FIG. 3 shows an apparatus according to FIG. 1 having an apparatus for assessing the state of the rubber-covered cylinder sleeve.
Figure 4:
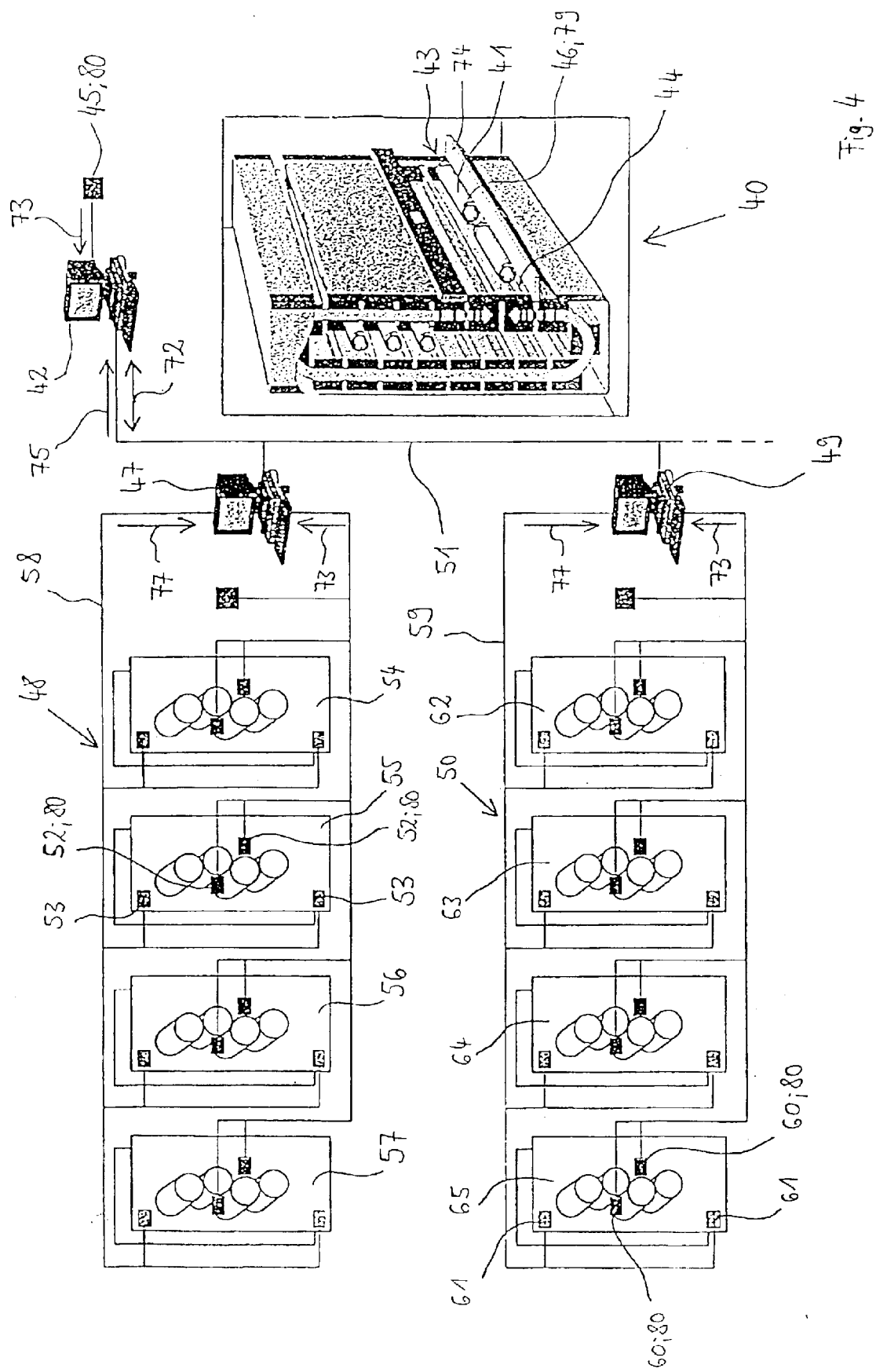
FIG. 4 shows an apparatus for storing and removing rubber-covered cylinder sleeves having an identifier according to the invention arranged on the rubber-covered cylinder sleeve.

When the rubber-covered cylinder sleeve 2 is being removed from store and provided from the apparatus 1, automatic transport from the apparatus 1 to the respective printing machine 9; 11 and/or to the respective printing unit 15 to 18; 23 to 26 can be carried out by means of a transport apparatus 37 (see FIG. 3).

The transport apparatus 37 can also be arranged in such a way that the rubber-covered cylinder sleeve 2 can be transported from the removal and storage position 4 to the respective printing machine 9; 11 and/or to the respective printing unit 15 to 18; 23 to 26.

Before the storage in the apparatus 1, the printer operating the printing machine must assess the damage status of the respective rubber-covered cylinder sleeve 2. The entry and transmission of his assessment about damage, and thus of the damage status resulting from the damage, is carried out directly by the printer operating the printing machine via a hand-held input device 27 configured as an operating desk and/or keyboard. The hand-held input device 27 can have a data-exchange connection to the memory device 3 (see FIG. 2).

FIG. 3 shows an apparatus 28 for assessing and registering the damage status of the respective rubber-covered cylinder sleeve 2. Here, the damage status is not assessed by the printer operating the printing machine, instead the apparatus 28 performs the task of assessing and registering the damage status of the respective rubber-covered cylinder sleeve 2.

The apparatus 28 (not specifically illustrated) can be an electromechanically configured apparatus, mechanical sensors 29 sensing the surface of the rubber-covered cylinder sleeve and these mechanical signals being converted into electronic data 30, these electronic data 30 defining the damage status then being transmitted automatically to the memory device 3.

Alternatively, the apparatus 28 can also be configured as an electronic or optoelectronic (optical and electronic) apparatus, the surface of the rubber-covered cylinder sleeve being sensed and checked for example by means of sensors 31 that emit sound waves, for example ultrasound, or sensors 32 which emit light beams, for example infrared or laser. The electronic data 30 defining the damage status are then again transmitted automatically to the memory device 3.

The functioning of the apparatus 1 is to be explained in more detail in the following text using the procedure of putting a rubber-covered cylinder sleeve into store and of providing or removing a rubber-covered cylinder sleeve from store.

Storing a Rubber-Covered Cylinder Sleeve

The printer operating the printing machine, by pressing a pushbutton on the control station or the computing and memory device 8; 10 of the printing machine 9; 11, starts the data exchange between the memory device 7 arranged on the rubber-covered cylinder sleeve 2 and the data exchange devices 13; 21 arranged in the printing units 15 to 18; 23 to 26, including a counter reading 38 transmitted from the counter outputs 14; 22 to the computing and memory device 8; 10.

Characteristic data 33 are transmitted from the data exchange devices 13; 21 arranged in a stationary manner in the individual printing units 15 to 18; 23 to 26 to the memory devices 7 arranged on the rubber-covered cylinder sleeve 2, and characteristic data 34 already on the memory device 7 are read from the latter. The stationary data exchange device 13; 21 is arranged in the immediate vicinity of the memory device 7.

The counter outputs 14; 22 of the individual printing units 15 to 18; 23 to 26 are connected to a machine control system or a control computer belonging to the machine or a computing and memory unit 8; 10, which, for example, are configured in the form of a computer.

The data exchange devices 13; 21 are connected to a machine control system or a control computer belonging to the machine or a computing and memory unit 8; 10, which, for example, are configured in the form of a computer.

The characteristic data 33 identifying the rubber-covered cylinder sleeve 2 and to be transmitted to the memory device 7 result from the information determined from the counter outputs 14; 22 of the individual printing units 15 to 18; 23 to 26, and also from the information resulting from the printing operation and already resulting from the rubber-covered cylinder manufacture and quality testing and preprogrammed.

The characteristic data 33 are transmitted to the data exchange device 13; 21 from the machine control system or from the control computer belonging to the machine or from the computing and memory unit 8; 10, and are transmitted automatically to the memory device 7.

The characteristic data 33; 34 are, for example, the identity number of the rubber-covered cylinder sleeve 2, the description of the rubber-covered cylinder sleeve 2, manufacturing data, service life and time of use, faults that have occurred during printing use, the type and number of printed images and further printing-based peripheral information, such as production information.

The aforementioned production information is, for example, data and information about the number of wash cycles, web width, grammage, net number of copies and average rotational speed.

Further characteristic data 33; 34 are, for example, test data, delivery data, and also date of first and last use. After the end of the service life, the reason for failure and the total number of rolling revolutions are stored.

The test data are to be understood to include physical and geometric test values, such as stiffness values, overall thickness and material thickness of the rubber-covered cylinder sleeve 2, and also diameter and roughness information.

Thus, the characteristic data comprise the data characterizing the rubber-covered cylinder sleeve 2 individually and/or operating data, such as machine data.

Following the transmission of the characteristic data 33 to the memory device 7, the rubber-covered cylinder sleeve 2 can be removed from the printing unit.

The printer operating the printing machine then has to determine the damage status using damage which has occurred to the surface of the rubber-covered cylinder sleeve 2.

Figure 2:
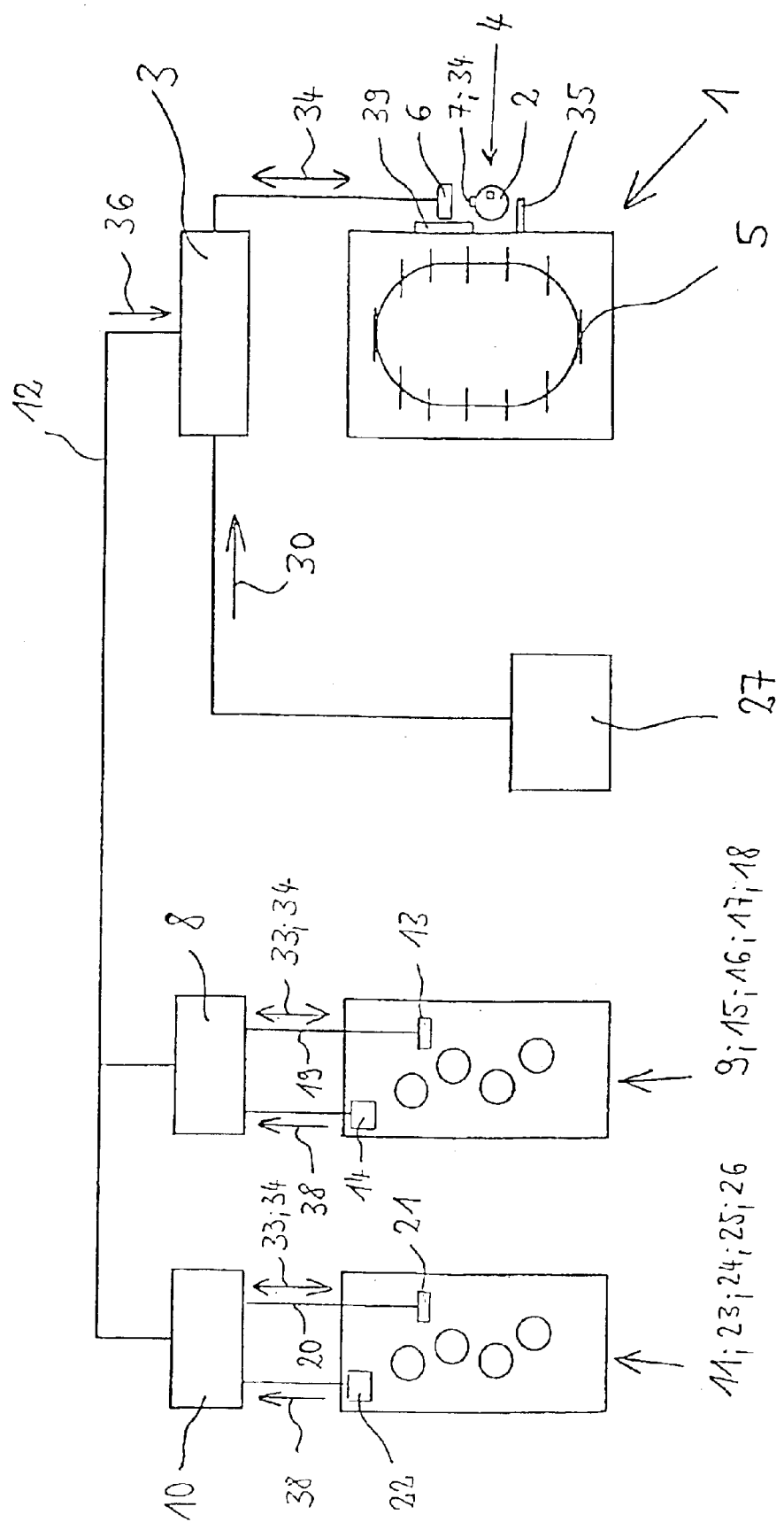
FIG. 2 shows an apparatus according to FIG. 1 having a hand-held input device to be operated by the printer operating the printing machine for assessing the state of the rubber-covered cylinder sleeve.

The data 30 about the damage status of the respective rubber-covered cylinder sleeve 2 are entered into the memory device 3 directly by the printer operating the printing machine via a hand-held input device 27 configured as an operating desk and/or as a keyboard (see FIG. 2).

Alternatively, the damage status of the respective rubber-covered cylinder sleeve 2 can be determined by means of an apparatus 28 (see FIG. 3). The printer operating the printing machine places the rubber-covered cylinder sleeve 2 to be tested in the apparatus 28, the apparatus 28 checking the surface of the rubber-covered cylinder sleeve for damage by means of sensors 29; 31; 32. The information determined by the sensors 29; 31; 32 is converted into electronic data 30 and these data 30, which provide information about the damage status of the respective rubber-covered cylinder sleeve 2, are in this case transmitted automatically to the memory device 3 from the apparatus 28.

The rubber-covered cylinder sleeve 2 is then brought to the apparatus 1 in order to be stored. The rubber-covered cylinder sleeve 2 is placed on a support element 35 arranged at the removal and storage position 4 of the apparatus 1. The data exchange devices 6 arranged at the removal and storage position 4 of the apparatus 1 read the characteristic data 34 stored on the memory device 7 of the rubber-covered cylinder sleeve 2 and transmit the respectively associated data 30 about the damage status in accordance with the identity number or description of the rubber-covered cylinder sleeve disclosed in these characteristic data 34. The characteristic data 34 read from the memory device 7 of the rubber-covered cylinder sleeve are transmitted to the memory device 3 and stored.

The rubber-covered cylinder sleeve 2 is then stored in an unoccupied storage space 5 which has previously been brought to the removal and storage position 4. The storage space 5 is stored in the memory device 3 together with the characteristic data 34 previously read out from the storage device 7. In addition, the storage space 5 can also be stored on the memory device 7 of the rubber-covered cylinder sleeve 2.

In the memory device 3, following the storage of the rubber-covered cylinder sleeve 2, it is therefore possible for all characteristic data 33; 34 to be stored and called up, the characteristic data 33; 34 comprising both the data identifying the rubber-covered cylinder individually and/or the operating data and/or the data 30 relating to the damage status.

Removing or Providing a Rubber-Covered Cylinder Sleeve

Via the control station, the machine control system, the control computer belonging to the machine and/or the computing and memory unit 8; 10, data 36 about a print job are transmitted to the memory unit 3 of the apparatus 1.

From these data 36, the memory device 3 searches for a suitable rubber-covered cylinder sleeve 2 which is stored in the apparatus 1, which is suitable both for the print job and for the respective printing unit 15 to 18; 23 to 26 in accordance with the characteristic data 33; 34, stored in the memory device 3, about the stored rubber-covered cylinder sleeves 2, and fulfils the set requirements resulting from the data 36.

If no suitable used rubber-covered cylinder sleeve 2 is available, then a new rubber-covered cylinder sleeve 2 stored in the apparatus 1 is selected by the memory device.

If a suitable rubber-covered cylinder sleeve 2 is found in the data contents of the memory device 3, then the apparatus 1 brings the storage location 5 of this rubber-covered cylinder sleeve 2 to the removal and storage position 4. There, the rubber-covered cylinder sleeve 2 can be removed by the printer operating the printing machine.

At the removal and storage position 4, by means of the identification device 39, for example a label, a description, a code or an imprint can be applied to the rubber-covered cylinder sleeve 2 to be removed from storage, using which a description or a note relating to the printing unit 15 to 18; 23 to 26 predetermined for the rubber-covered cylinder sleeve 2 can be applied to the rubber-covered cylinder sleeve 2, irrespective of the data contents of the memory device 7. As a result, finding this printing unit is made easier for the printer operating the printing machine.

When the rubber-covered cylinder sleeve 2 is being removed from storage and provided from the apparatus 1, automatic transport from the apparatus 1 to the respective printing machine 9; 11 and/or to the respective printing unit 15 to 18; 23 to 26 can be carried out by means of a transport apparatus 37 (see FIG. 3).

The rubber-covered cylinder sleeve 2 is inserted into the suitable printing unit 15 to 18; 23 to 26.

By means of pressing a pushbutton on the control station or the computing and memory device 8; 10 belonging to the printing machine 9; 11, the printer operating the printing machine starts the data exchange between the memory device 7 arranged on the rubber-covered cylinder sleeve 2 and the data exchange devices 13; 21 arranged in the printing units 15 to 18; 23 to 26, including a counter reading 38 transmitted from the counter outputs 14; 22 to the computing and memory device 8; 10.

Thus, the characteristic data 34 of the rubber-covered cylinder sleeve 2 are read into the computing and memory device 8; 10 of the respective printing machine 9; 11, and the database contained in the computing and memory device 8; 10 is updated via the characteristic data 34.

Characteristic data 33 are transmitted to the memory devices 7 arranged on the rubber-covered cylinder sleeve 2 by the data exchange devices 13; 21 arranged in a stationary manner in the individual printing units 15 to 18; 23 to 26 and characteristic data 34 already on the memory device 7 are read from the latter.

If rubber-covered cylinder sleeves 2 needed for future print jobs are missing or, on the basis of the statistics about the probable time of failure of a rubber-covered cylinder sleeve 2, there is a requirement for new rubber-covered cylinder sleeves in the future, then ordering can be triggered automatically via the apparatus 1 or the memory device 3. It is significant that additional information, such as function-relevant characteristics, the number of rolling revolutions, production information, the times of the construction and the respective uses and/or decommissioning, the cause of the failure, re-usability, etc., can be applied directly to the memory device 7 of the rubber-covered cylinder sleeve 2 in the form of electronic characteristic data 33; 34. Thus, via the memory device 7 of the respective rubber-covered cylinder sleeve 2 this aforementioned information can be transmitted to the printing machine 9; 11 and/or to the apparatus 1 or the memory device 3 belonging to the apparatus 1 for storing rubber-covered cylinder sleeves 2 and can be mutually exchanged.

By means of these characteristic data 33; 34, it is possible to determine the causes of failure and, in this way, a basis for the assessment for the individual fabrication methods or other manufacturing data is made possible.

The memory device 7 is thus used as a data carrier and as a means for data transmission and for data exchange for the characteristic data 33; 34 identifying the rubber-covered cylinder sleeve 2 individually.

Furthermore, the memory device 7 also serves as a data carrier for forwarding the characteristic data 33 initially transmitted from the printing machine 9; 11 to the memory device 7 to the memory device 3 of the apparatus 1. Conversely, the memory device 7 also serves as a data carrier for forwarding the characteristic data 33 initially transmitted from the memory device 3 to the memory device 7 to the printing machine 9; 11.

Although not specifically illustrated, the characteristic data 33 can be transmitted to the memory device 3 and the memory device 7 and exchanged by means of a data exchange device designed as a portable hand-held device, instead of by means of the data exchange devices 6; 13; 21 arranged in a stationary manner.

The apparatus 1 and the associated memory device 3 can furthermore also be used for assessing print quality and wear of rubber-covered cylinder sleeves 2, and are not intended to be restricted just to the use for storing and providing rubber-covered cylinder sleeves 2.

Particular mention should be made of the fact that the computing and/or memory device 3 of the apparatus 1 is equipped with an interface 90, which can be tapped into from an external location $E_1$, it being possible, via this interface 90, for the characteristic data 33; 34 and the information from the respective rubber-covered cylinder sleeve 2 and the data and the information about the production sequence, the conditions of use and process data of the respective printing machine 9; 11 and/or of the respective printing unit 15; 16; 17; 18; 23; 24; 25; 26 to be called up from an external location $E_1$, and for new characteristic data 33; 34 and information to be transmitted from the external location $E_1$ to the computing and/or memory device 3 (see FIG. 3).

Thus, the data or characteristic data 33; 34, for example manufacturing data and information that is produced individually during the manufacture, about a new rubber-covered cylinder sleeve 2 can be transmitted from the rubber-covered cylinder sleeve manufacturer, via the externally accessible interface 90, into the computing and/or memory device 3 belonging to the apparatus 1 and stored there.

For the rubber-covered cylinder manufacturer and the printing-machine manufacturer, the externally accessible interface 90 results in the advantage that the characteristic data 33; and information about the rubber-covered cylinder sleeves 2, 34 stored and managed in the computing and/or memory device 3, the production data and the machine data, provide the respective manufacturer with conclusions about the quality, about possible or real causes of failure and about the behavior in the production use of his products.

Thus, on the basis of these data and information transmitted to him the manufacturer is in a position to carry out quality improvements on printing machines, printing units or rubber-covered cylinder sleeves already set up at the customer, supplied to the customer or even on new ones.

Furthermore, the manufacturer can set up a central database, which contains all the aforementioned characteristic data and information which accumulate or are determined at the customer and are transmitted via the external interface.

Figure 5:
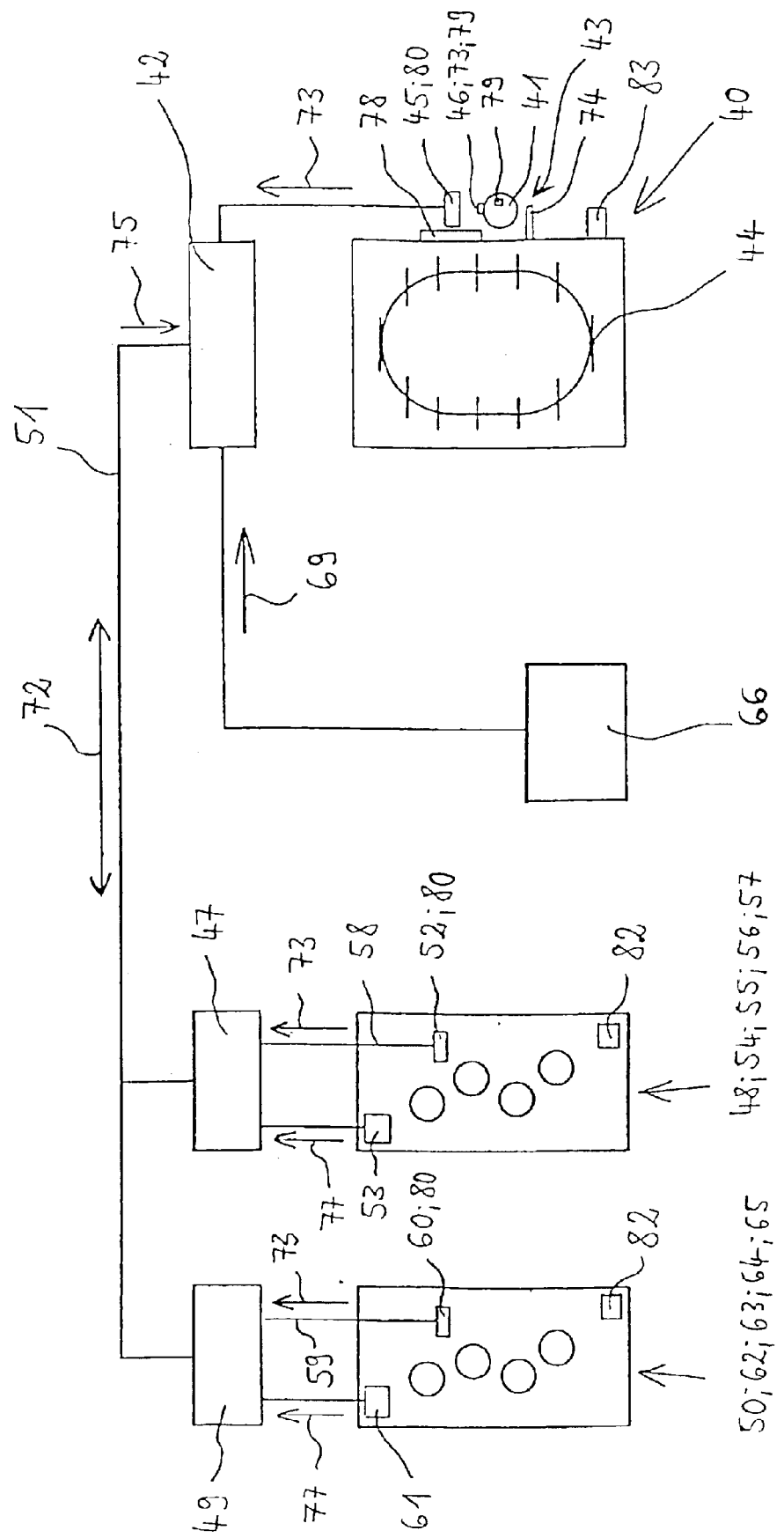
FIG. 5 shows an apparatus according to FIG. 4 having a hand-held input device to be operated by the printer operating the printing machine for assessing the state of the rubber-covered cylinder sleeve.

FIG. 5 shows an apparatus 40 for storing rubber-covered cylinder sleeves 41, which is connected to a memory device 42.

The apparatus 40 is, for example, designed as a magazine-like or paternoster-like store or high-rack store. The apparatus 40 has a large number of storage spaces 44, which are arranged one behind another, one above another and/or one beside another in the apparatus 40, it being possible for the respective storage space 44 to be brought to a removal and storage position 43. Data readers 45 are fitted in a stationary manner to the apparatus 1 in the area of the removal and storage position 43.

Using these data readers 45, memory devices 46 located on the rubber-covered cylinder sleeves 41 can be read. The memory device 46 is configured as a transponder. Although not specifically illustrated, the memory device 46 can alternatively also be a magnetic strip, a memory chip or the like.

Alternatively, instead of the memory device 46, in addition only an identifier 79 can be applied to the rubber-covered cylinder sleeve 41. The identifier 79 can be burned in on the inner side of the rubber-covered cylinder sleeve 41 or can be any other type of inscription or identifier, for example in the form of a bar code, which is arranged on the surface or on one of the ends of the rubber-covered cylinder sleeve 41.

The data reader 45 is in this case then configured as a scanner 80, for example. Using this scanner 80, the respective identifier 79 can be detected, and the information encoded by the identifier 79, for example the identity number of the rubber-covered cylinder sleeve, can be read.

If identifiers 79 are used which cannot be read or detected by a mechanical data reader, for example the data reader 45 or the scanner 80, then input devices 82; 83 are arranged on respective printing units 54 to 57; 62 to 65 and on the apparatus 40. By means of the input devices 82; 83, the printer who is to operate the printing machine can manually enter the identifier 79 applied to the rubber-covered cylinder sleeve 41.

The data readers 45 can alternatively also be configured as data exchange devices, the reading and writing of memory devices 46 being possible with these data exchange devices.

The memory device 42 of the apparatus 40 has a data-exchange connection to a computing and memory device 47 of a first printing machine 48 and to a computing and memory device 49 of a further printing machine 50. Any desired number of memory devices and any desired number of printing machines can have a data-exchange connection via data lines 51 to the memory device 42 of the apparatus 40.

The computing and memory device 47 of the printing machine 48 is connected via data lines 58 to data readers 52 and counter outputs 53 of the individual printing units 54; 55; 56; 57 of the printing machine 48.

The computing and memory device 49 of the printing machine 50 is connected via data lines 59 to data readers 60 and counter outputs 61 of the individual printing units 62; 63; 64; 65 of the printing machine 50.

Alternatively, the data readers 52; 60 can also be configured as data exchange devices, the reading and writing of memory devices 46 being possible with these data exchange devices.

The computing and memory devices 47; 49 can be a control station, a machine control system or a central computer of the printing machine 48; 50. Alternatively, the memory device 42 of the apparatus 40 can be integrated into at least one of the computing and memory devices 47; 49 or replaced by at least one of the computing and memory devices 47; 49. All the computing and memory devices 42; 47; 49 can also be designed as a memory unit 81.

A device for identifying 78 the rubber-covered cylinder sleeves 41 to be removed from store can be arranged at the removal and storage position 43 of the apparatus 40. Using this identification device 78, it is possible, for example, to apply a label, a description, a code or an imprint to the rubber-covered cylinder sleeve 41 to be removed from store. Thus, a description for the printing unit intended for the rubber-covered cylinder sleeve can be applied to the rubber-covered cylinder sleeve 41, irrespective of the identity number of this rubber-covered cylinder sleeve 41 stored in a data-based manner in the memory device 46. By means of this description, applied by the identification device 78, it is made easier for the printer operating the printing machine to find the printing unit which is predetermined and identifiable uniquely on the label or the description.

Figure 6:
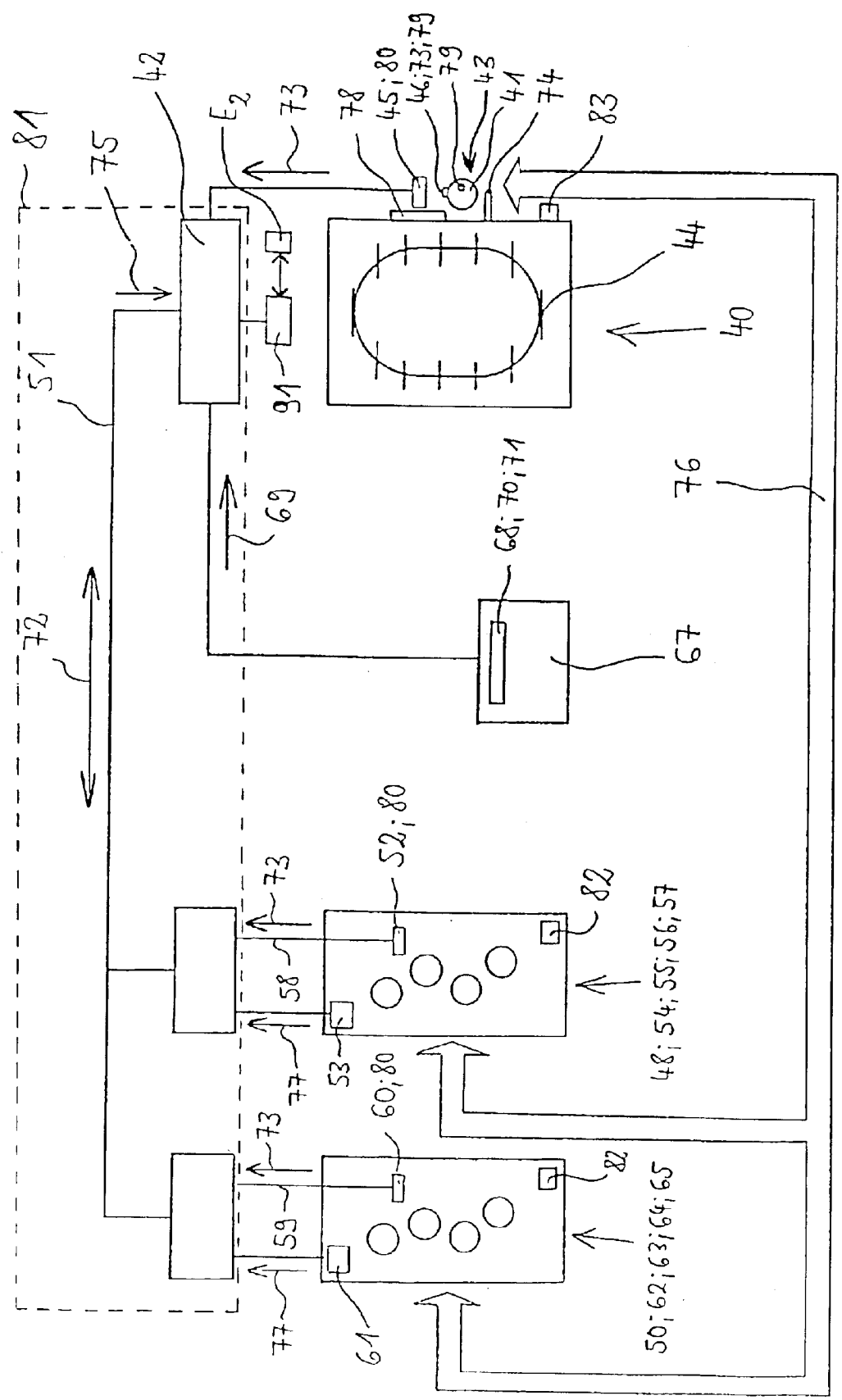
FIG. 6 shows an apparatus according to FIG. 4 having an apparatus for assessing the state of the rubber-covered cylinder sleeve.

When the rubber-covered cylinder sleeve 41 has been removed from store and provided from the apparatus 40, automatic transport from the apparatus 40 to the respective printing machine 48; 50 and/or to the respective printing unit 54 to 57; 62 to 65 can be carried out by means of a transport apparatus 76 (see FIG. 6). Alternatively, the transport apparatus 76 can be arranged in such a way that the rubber-covered cylinder sleeve 41 can be transported from the removal and storage position to the respective printing machine 48; 50 and/or to the respective printing unit 54 to 57; 62 to 65.

By using the transport apparatus 76 the rubber-covered cylinder sleeve 41 can also be transported from the respective printing machine 48; 50 and/or the respective printing unit 54 to 57; 62 to 65 to the apparatus 40 or to the removal and storage position 43 of the apparatus 40.

Before the sleeve is stored in the apparatus 40, the printer operating the printing machine must assess the damage status of the respective rubber-covered cylinder sleeve 41. Entering and determining his assessment of damage, and thus the damage status resulting from the damage, is carried out by the printer operating the printing machine directly via a hand-held input device 66 configured as an operating desk and/or keyboard. The hand-held input device 66 can have a data-exchange connection to the memory device 42 (see FIG. 5).

FIG. 6 shows an apparatus 67 for assessing and registering the damage status of the respective rubber-covered cylinder sleeve 41. Here, no assessment of the damage status is carried out by the printer operating the printing machine, instead the apparatus 67 performs this task.

Although not specifically illustrated, the apparatus 67 can be an electromechanically configured apparatus, mechanical sensors 68 sensing the surface of the rubber-covered cylinder sleeve and these mechanical signals being converted into electronic data 69, these electronic data 69, defining the damage status, then being transmitted automatically to the memory device 42.

Alternatively, the apparatus 67 can also be configured as an electronic or optoelectronic (optical and electronic) apparatus, the surface of the rubber-covered cylinder sleeve 41 being scanned and checked, for example, by means of sensors 70 that emit sound waves, for example ultrasound, or sensors 71 that emit light beams, for example infrared or laser. The electronic data 69 defining the damage status are then again transmitted automatically to the memory device 42.

The functioning of the apparatus 40 is to be explained in more detail in the following text using the procedure of storing a rubber-covered cylinder sleeve and of providing or removing a rubber-covered cylinder sleeve from storage.

Storing a Rubber-Covered Cylinder Sleeve

By pressing a pushbutton on the control station or the computing and memory device 47; 49 of the printing machine 48; 50, the printer operating the printing machine starts the data exchange between the computing and memory device 47; 49 and the memory device 42.

For the purpose of data exchange, characteristic data 72 from the respective rubber-covered cylinder sleeve 41 in the printing units 54 to 57; 62 to 65 are transmitted from the computing and memory device 47; 49 to the memory device 42, including an identity number 73 applied to the memory device 46 of the rubber-covered cylinder sleeve and including a counter reading 77 transmitted from the counter outputs 53; 61 to the computing and memory device 47; 49.

By means of the data readers 52; 60 arranged in a stationary manner in the individual printing units 54 to 57; 62 to 65, the identity number 73 is read from the memory device 46 arranged on the rubber-covered cylinder sleeve 41.

The stationary data reader 52; 60 is arranged in the immediate vicinity of the memory device 46.

The counter outputs 53; 61 of the individual printing units 54 to 57; 62 to 65 are connected to a machine control system or a control computer belonging to the machine or to a computing and memory unit 47; 49 which, for example, are configured in the form of a computer.

The data readers 52; 60 are connected to a machine control system or a control computer belonging to the machine or to a computing and memory unit 47; 49, which are configured for example in the form of a computer.

The characteristic data 72 identifying the rubber-covered cylinder sleeve 41 and to be exchanged or transmitted among the memory devices 42; 47; 49 result from the information determined from the counter outputs 53; 61 of the individual printing units 54 to 57; 62 to 65, and also from the information resulting from the printing operation, for example operating data and machine data. Furthermore, the characteristic data 72 identifying the rubber-covered cylinder sleeve 41 and to be exchanged or to be transmitted among the memory devices 42; 47; 49 comprise data and information identifying the rubber-covered cylinder sleeve individually and already resulting during the rubber-covered cylinder manufacture and quality testing and stored on the memory device 46 of the rubber-covered cylinder sleeve 41.

The characteristic data 72 are automatically transmitted to the memory device 42 from the machine control system or from the control computer belonging to the machine or from the computing and memory unit 47; 49.

The characteristic data 72 are, for example, the identity number 73 of the rubber-covered cylinder sleeve 41, the description of the rubber-covered cylinder sleeve 41, manufacturing data, service life and time of use, faults that have occurred during printing use, the type and number of printed images and further printing-based peripheral information, such as production information.

The abovementioned production information is, for example, data and information about the number of wash cycles, web width, grammage, net number of copies and average rotational speed.

Further characteristic data 72 are, for example, test data, delivery data, and also date of first and last use. After the end of the service life, the reason for failure and the total number of rolling revolutions are stored.

The test data are to be understood to include physical and geometric test values, such as stiffness values, total thickness and material thickness of the rubber-covered cylinder sleeve 41, and also diameter and roughness information.

Following the transmission of the identity number 73 to the memory devices 42; 47; 49, the rubber-covered cylinder sleeve 41 can be removed from the printing unit.

The printer operating the printing machine then has to determine the damage status using damage which has occurred to the surface of the rubber-covered cylinder sleeve 41.

The data 69 about the damage status of the respective rubber-covered cylinder sleeve 41 are entered directly into the memory device 42 by the printer operating the printing machine via a hand-held input device 66 configured as an operating desk and/or as a keyboard (see FIG. 5).

Although not specifically illustrated, the hand-held input device 66 can also be connected to one of the computing and memory devices 47; 49, the data 69 about the damage status being transmitted from the respective computing and memory device 47; 49 to the memory device 42.

Alternatively, the damage status of the respective rubber-covered cylinder sleeve 41 can be determined by means of an apparatus 67 (see FIG. 6). The printer operating the printing machine places the rubber-covered cylinder sleeve 41 to be tested in the apparatus 67, the apparatus 67 checking the surface of the rubber-covered cylinder sleeve 41 for damage by means of sensors 68; 70; 71. The information determined by the sensors 68; 70; 71 is converted into electronic data 69 and these data 69, which provide information about the damage status of the respective rubber-covered cylinder sleeve 41, are in this case automatically transmitted from the apparatus 67 to the memory device 42.

The rubber-covered cylinder sleeve 41 is then brought to the apparatus 40 in order to be stored. The rubber-covered cylinder sleeve 41 is placed on a support element 74 arranged at the removal and storage position 43 of the apparatus 40. The data readers 45 arranged at the output and storage position 43 of the apparatus 40 read the identity number 73 stored on the memory device 46 of the rubber-covered cylinder sleeve 41 and transmit the said number to the memory device 42. In the memory device 42, in accordance with the identity number 73 read in from the rubber-covered cylinder sleeve 41 to be stored, a search is made there for the stored characteristic data 72, and the respectively associated data 69 of the damage status is added to these characteristic data 72.

The rubber-covered cylinder sleeve 41 is then stored in an unoccupied storage space 44, which has previously been brought to the removal and storage position 43. The storage space 44 is stored, together with the identity number 73 previously read out, in addition to the characteristic data 72 already stored in the memory device 42.

Thus, the characteristic data 72 of the rubber-covered cylinder sleeve 41 stored in the apparatus 40 are updated and stored in the memory device 42. The characteristic data 72 that are stored in the memory device 42 and can be called up therefore comprise, in addition to the information about the storage space 44, the data 69 about the damage status, the data identifying the rubber-covered cylinder sleeve individually and operating data.

The characteristic data 72 that identify the rubber-covered cylinder sleeve 41, are stored in the memory device 42 and can be called up result from information determined from the counter outputs 53; 61 of the individual printing units 54 to 57; 62 to 65 and also the information resulting from the printing operation, for example operating data and machine data. Furthermore, the characteristic data 72 that are stored in the memory device 42 and can be called up comprise data and information already resulting during the rubber-covered cylinder manufacture and quality testing and therefore identifying the rubber-covered cylinder sleeve individually.

If data transmission devices are used instead of the data readers 45, the storage space 44 can additionally also be stored on the memory device 46 of the rubber-covered cylinder sleeve 41.

Removal or Provision of a Rubber-Covered Cylinder Sleeve

Via the control station, the machine control system, the control computer belonging to the machine and/or the computing and memory unit 47; 49, data 75 about a print job are transmitted to the memory device 42 of the apparatus 40.

From these data 75, the memory device 42 searches for a suitable rubber-covered cylinder sleeve 41 which is stored in the apparatus 40, which is suitable both for the print job and for the respective printing unit 54 to 57; 62 to 65 in accordance with the characteristic data 72, stored in the memory device 42, about the stored rubber-covered cylinder sleeves 41, and fulfils the set requirements resulting from the data 75.

If no suitable used rubber-covered cylinder sleeve 41 is available, then a rubber-covered cylinder sleeve 41 which is new, has not yet been in production use and is stored in the apparatus 40 is selected by the memory device 42.

If a suitable rubber-covered cylinder sleeve 41 is found in the data contents of the memory device 42, then the apparatus 40 brings the storage space 44 of this rubber-covered cylinder sleeve 41 to the removal and storage position 43. There, the rubber-covered cylinder sleeve 41 can then be removed by the printer operating the printing machine.

Before, while or immediately after the storage space 44 containing the rubber-covered cylinder sleeve 41 is brought to the removal and storage position 43, the characteristic data 72 stored in the memory device 42 and relating to the rubber-covered cylinder sleeve 41 are fed to the computing and memory device 47; 49 of the respective printing machine 48; 50.

At the removal and storage position 43, by means of the identification device 78, for example a label, a description, a code or an imprint can be applied to the rubber-covered cylinder sleeve 41 to be provided and removed from store, using which a description or a note for the printing unit 54 to 57; 62 to 65 predetermined for the use of the rubber-covered cylinder sleeve 41 can be applied to the rubber-covered cylinder sleeve 41, irrespective of the data contents of the memory device 46. As a result, it is made easier for the printer operating the printing machine to find the printing unit 54 to 57; 62 to 65 predetermined for the use of the rubber-covered cylinder sleeve 41.

When the rubber-covered cylinder sleeve 41 is being removed from storage and provided from the apparatus 40, automatic transport from the apparatus 40 or from the removal and storage position 43 to the respective printing machine 48; 50 and/or to the respective printing unit 54 to 57; 62 to 65 can be carried out by means of a transport apparatus 76 (see FIG. 6).

The rubber-covered cylinder sleeve 41 is inserted into the suitable printing unit 54 to 57; 62 to 65.

By means of pressing a pushbutton on the control station or the computing and memory device 47; 49 belonging to the printing machine 48; 50, the printer operating the printing machine starts the data exchange between the memory device 42 and the computing and memory device 47; 49. The identity number 73 of the rubber-covered cylinder sleeve 41 is read from the memory device 46 of the rubber-covered cylinder sleeve 41 by the data readers 52; 60 arranged in the printing units 54 to 57; 62 to 65 and, including a counter reading 77 transmitted from the counter outputs 53; 61, is forwarded to the computing and memory device 47; 49 and/or to the memory device 42.

Thus, the characteristic data 72 of the rubber-covered cylinder sleeve 41 in the computing and memory device 47; 49 of the respective printing machine 48; 50 are updated, including the counter reading 77, and, if necessary, are forwarded once more to the memory device 42.

If rubber-covered cylinder sleeves 41 needed for future print jobs should be missing or, on the basis of the calculated statistics about the probable time of failure of a rubber-covered cylinder sleeve 41, a demand for new rubber-covered cylinder sleeves 41 should arise in the future or, merely by analysing the characteristic data 72, it should be established that there is a demand for new rubber-covered cylinder sleeves 41 on account of wear or else unforeseen failures, then all this can be initiated automatically via the apparatus 40 or the memory device 42.

Ordering in this way can also be triggered from the control station, the central computer or the computing and memory device 47; 49 of the printing machine 48; 50.

It is significant that additional information, such as function-relevant characteristics, the number of rolling revolutions, production information, the times of construction and respective uses and/or decommissioning, the cause of the failure, re-usability, etc., can be applied directly to the memory device 46 of the rubber-covered cylinder sleeve 41 in the form of electronic characteristic data 72. Thus, in the event of failure of and/or damage to the data line 51 or other data-exchange connections between the computing and memory devices 47; 49 and the memory device 42, this aforementioned information about the printing machine 48; 50 and/or the apparatus 40 or the memory device 42 of the apparatus 40 for storing rubber-covered cylinder sleeves 41 can be transmitted and mutually exchanged via the memory device 46 of the respective rubber-covered cylinder sleeve 41.

The memory device 46 can therefore serve as a data carrier and for the data exchange for the characteristic data 72 identifying the rubber-covered cylinder sleeve 41 individually.

By means of these characteristic data 72, it is possible to determine the causes of failure in rubber-covered cylinder sleeves 41 and, in this way, a basis for the assessment for the individual fabrication methods or other manufacturing data of rubber-covered cylinder sleeves 41 is made possible.

Although not specifically illustrated, the identification number 73 can be read by means of a data reader designed as a portable hand-held device instead of by means of the data readers 45; 52; 60 arranged in a stationary manner, and can be transmitted to the computing and memory device 47; 49 or the memory device 42.

The apparatus 40 and the associated memory device 42 can furthermore also be used for assessing print quality and wear of rubber-covered cylinder sleeves 41, and are not intended to be restricted just to the use for storing and providing rubber-covered cylinder sleeves 41.

Particular mention should be made of the fact that the computing and/or memory device 42 of the apparatus 40 is equipped with an interface 91, which can be tapped into from an external location $E_2$, it being possible, via this interface 91, for the characteristic data 72 and the information from the respective rubber-covered cylinder sleeve 41 and the data and the information about the production sequence, the conditions of use and process data of the respective printing machine 48; 50 and/or of the respective printing unit 54; 55; 56; 57; 62; 63; 64; 65 to be called up from the external location $E_2$, and for new characteristic data 72 and information to be transmitted from the external location $E_2$ to the computing and/or memory device 42 (see FIG. 6).

Thus, the data or characteristic data 72, for example manufacturing data and information that is produced individually during the manufacture, about a new rubber-covered cylinder sleeve 41 can be transmitted from the rubber-covered cylinder sleeve manufacturer, via the externally accessible interface 91, into the computing and/or memory device 42 of the apparatus 40 and stored there.

For the rubber-covered cylinder manufacturer and the printing-machine manufacturer, the externally accessible interface 91 results in the advantage that the characteristic data 72 and information about the rubber-covered cylinder sleeves 41, stored and managed in the computing and/or memory device 42, the production data and the machine data can provide the respective manufacturer with conclusions about the quality, about possible or real causes of failure and about the behavior in the production use of his products.

Thus, on the basis of these data and information transmitted to him, the manufacturer is in a position to perform quality improvements on printing machines, printing units or rubber-covered cylinder sleeves already set up at the customer, supplied to the customer or even on new ones.

Figure 7:
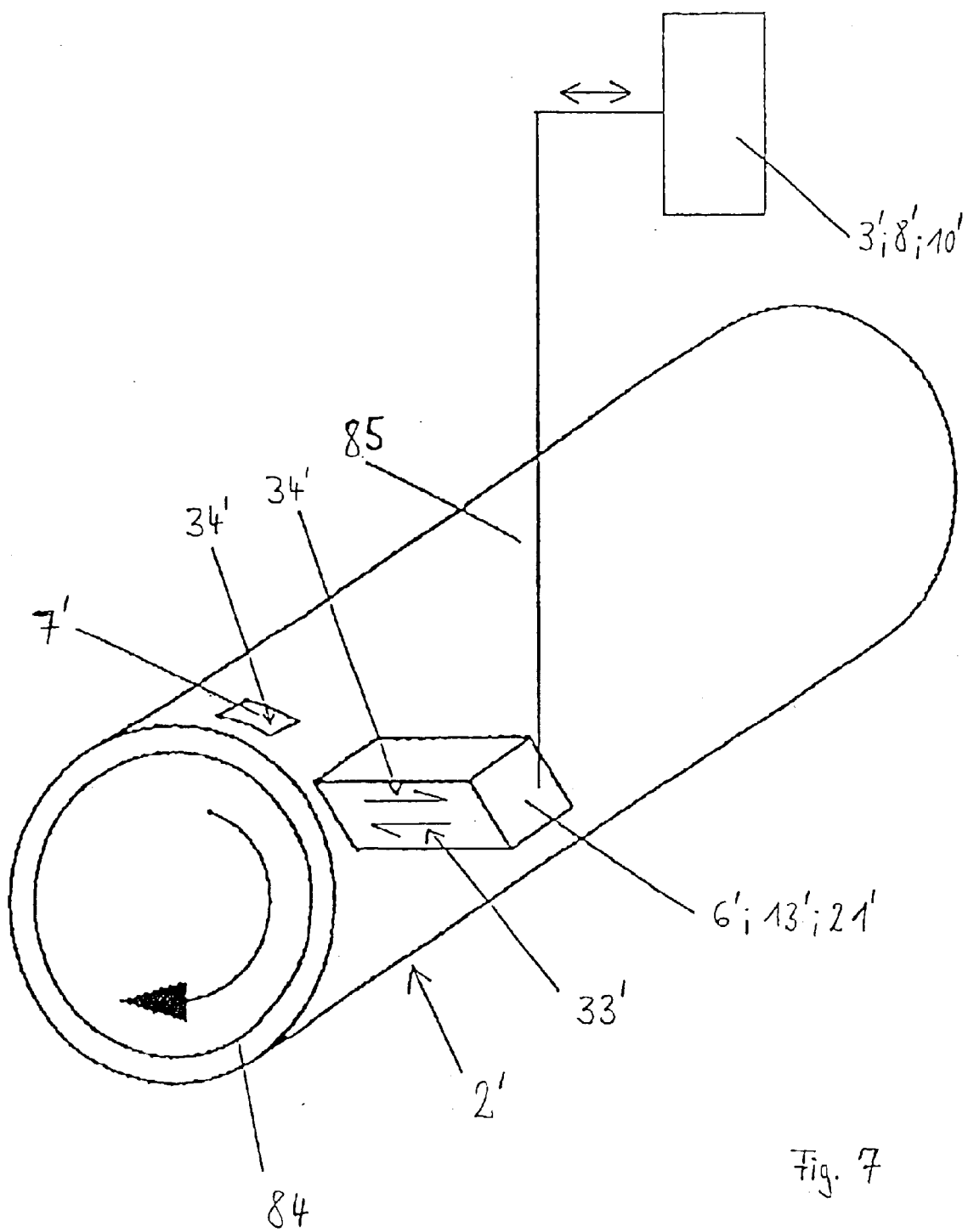
FIG. 7 shows a rubber-covered cylinder sleeve having a memory device according to the invention.

FIG. 7 shows a rubber-covered cylinder sleeve 2' which has a support sleeve 84 on which a rubber layer 85 is vulcanized on or adhesively bonded on. The rubber layer 85 is advantageously of compressible configuration and, although not specifically illustrated, can consist of a plurality of different layers and/or materials.

A coating of this type is shown, for example, in U.S. Pat. No. 6,148,725.

The rubber layer 85 has at its surface a covering layer (not specifically illustrated), with which printing by the offset printing process is possible.

The support sleeve 84 used is preferably a metal sleeve, for example one made of nickel, steel or aluminium, or a plastic sleeve, for example one made of carbon-fibre-reinforced plastic.

In a marginal area of the rubber layer 85, preferably in a non-printing area of the rubber layer 85, there is arranged an electronic memory device 7' configured as a transponder.

Although not specifically illustrated, the memory device 7' can alternatively also be a magnetic strip, a memory chip or the like.

The transponder 7' is advantageously let into the rubber layer 85, that is to say surrounded on all sides by the material of the rubber layer 85, so that optimum protection for the transponder 86 is ensured.

Alternatively, although not specifically illustrated, the transponder 7' can be arranged at the marginal area of the rubber layer 85 in such a way that one side of the transponder 86 is not surrounded by the rubber layer and is therefore exposed.

Both the outer side and the inner side of the rubber-covered cylinder sleeve 2' are configured to be free of elevations.

It is often the case that the marginal area of the rubber layer 85 is located some tenths of a millimeter lower than the remaining part of the rubber layer 85. In this marginal area, exposed to lower loading, the transponder 7' is advantageously arranged.

Characteristic data 33' are transmitted to the transponder 7' from a data exchange device 6'; 13'; 21' arranged in a stationary manner in the printing machine, and characteristic data 34' already on the transponder 7' are read from the latter. The stationary data exchange device 6'; 13'; 21' is arranged in the immediate vicinity of the transponder 7'. The data exchange device 6'; 13'; 21' is connected to a machine control system or a control computer belonging to the machine or a computing and memory unit 3'; 8'; 10, for example a separate evaluation unit in the form of a computer.

The characteristic data 33' are transmitted to the data exchange device 6'; 13'; 21' from the machine control system or from the control computer belonging to the machine or from the computing and memory unit 3'; 8'; 10', and are transmitted automatically to the transponder 7'.

Although not specifically illustrated, the characteristic data 33' are either entered into the machine control system by the operator, directly via an operating desk and/or a keyboard, or determined by the machine control system itself.

The characteristic data 33'; 34' are, for example, manufacturing data, service life and time of use, faults that have occurred during printing use, number of rolling revolutions, type and number of printed images and further printing-based peripheral information.

Although not specifically illustrated, the characteristic data 33'; 34' can be transmitted to and exchanged with the transponder 7' by means of a data exchange device designed as a portable hand-held device instead of by means of the data exchange device 6'; 13'; 21' arranged in a stationary manner.

Furthermore, the transponder 7' and the data exchange device 6'; 13'; 21' can also be used for assessing manufacturing methods, print quality and wear on rubber blankets, and are not intended to be restricted just to the use in rubber-covered cylinder sleeves.

Although not specifically illustrated, the arrangement of the transponder 7' on the rubber-coated area of the support sleeve is not absolutely necessary. The arrangement of the transponder 7' can, for example, be carried out on the ends of the rubber layer 85, the transponder 7' being adhesively bonded on by means of a seal which is designed as an adhesive and serves to seal the ends of the rubber layer 85.

Thus, the subsequent adhesive bonding of the transponder 7' or any other memory device is possible in the printing works.

The transponder 7' or any other memory device can be fitted at any desired location on the rubber-covered cylinder sleeve 2', it being possible for the transponder 7' to be fixed to the rubber-covered cylinder sleeve 2' by a fixing means designed as an adhesive tape.

The transponder 7' or the memory device can advantageously be designed to be self-adhesive or self-fixing.

Although not specifically illustrated, the transponder 7' or the memory device can also be embedded in the metal layer of the support sleeve 84 or arranged and/or fixed on the metal layer 84.

It is also possible for an additional element or additional means or an extension of the rubber-covered cylinder sleeve 2' to be arranged and fixed on the rubber-covered cylinder sleeve 2' on which the transponder 7' or the memory device can be arranged and/or fixed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for managing rubber-covered cylinder sleeves for an offset rotary printing machine, said system comprising
    a storage apparatus for storing said sleeves when not in use in said printing machine;
    a main electronic memory device into which characteristic data for each sleeve can be entered, stored, and managed;
    means for introducing the sleeves into the storage apparatus;
    means for reading the characteristic data into the memory device as one of the sleeves is introduced into the storage apparatus;
    means for determining suitability of said sleeves for a specific print job based on said characteristic data; and
    means for removing one of said sleeves from the storage apparatus in accordance with the suitability for a specific print job.

2. A system as in claim 1 wherein said characteristic data comprise data which identify the individual sleeve and production history information.

3. A system as in claim 2 further comprising means for determining data about the damage status of the rubber-covered cylinder sleeves, said characteristic data further comprising said data about damage status.

4. A system as in claim 3 wherein said means for determining data about the damage status comprises a hand-held input device into which data about the damage status at the sleeves can be entered.

5. A system as in claim 3 further comprising computing and memory devices for printing machines, said data about damage status being transmitted to one of the main memory device and the computing and memory devices.

6. A system as in claim 1 wherein said storage has individual sleeve storage spaces which are arranged at least one of beside one another and above one another and behind one another and such that they can circulate and such that they can be moved.

7. A system as in claim 6 wherein said individual sleeve storage spaces can be moved to a storage and removal position.

8. A system as in claim 1 further comprising an identifier arranged on each sleeve, said characteristic data for each sleeve being assignable to the respective identifier and readable into the main memory device at the time of storage.

9. A system as in claim 8 further comprising one of a data reader and a scanner by means of which the identifier can be read into the main memory device, at least one of the characteristic data that can be assigned to the identifier and changed characteristic data and data about damage status being exchangeable between the main memory device and computing and memory devices of printing machines, and being stored on the respective memory devices.

10. A system as in claim 1 further comprising an auxiliary electronic memory device assigned to each said sleeve, said auxiliary electronic memory device carrying an identity number by means of which the characteristic data can be assigned to the respective sleeve and read into the main memory device at the time of storage.

11. A system as in claim 10 wherein said identity number can be read from the auxiliary memory device into the main memory device at the time of storage.

12. A system as in claim 10 further comprising a data reader by means of which the identity number can be read from the auxiliary memory device into the main memory device, at least one of the characteristic data that can be assigned to the identifier and changed characteristic data and data about damage status being exchangeable between the main memory device and computing and memory devices of printing machines, and being stored on the respective memory devices.

13. A system as in claim 12 comprising one of said data readers associated with said storage apparatus and with each of a plurality of printing units.

14. A system as in claim 13 wherein said data readers are configured as data exchange devices, whereby said characteristic data can be exchanged between the main memory device and the computing and memory devices of printing machines and stored.

15. A system as in claim 10 wherein said auxiliary memory device provides means for data transmission and exchange between the main memory device and computing and memory devices of the printing machines.

16. A system as in claim 10 wherein said auxiliary memory device comprises a transponder.

17. A system as in claim 1 further comprising an auxiliary electronic memory device assigned to each said sleeve, said characteristic data being stored on the auxiliary memory device and read into the main memory device at the time of storage.

18. A system as in claim 17 wherein data is read from said auxiliary memory device without contact.

19. A system as in claim 1 further comprising computing and memory devices of a printing machine, said main memory device being integrated into at least one of said completing and memory devices.

20. A system as in claim 1 further comprising computing and memory devices for printing machines, said main memory device and said computing and memory devices being integrated into at least one memory unit.

21. A system as in claim 1 further comprising a transport apparatus for transporting the sleeves from the storage apparatus to the printing machine.

22. A system as in claim 1 further comprising means for identifying the sleeves arranged on the storage apparatus.

23. A system as in claim 3 further comprising means for automatically initiating and carrying out ordering of new sleeves by means by said characteristic data stored in said main memory device.

24. A system as in claim 1 further comprising means for calculating statistics about the probability of failure of the sleeves by means of said characteristic data stored in said main memory device.

25. A system as in claim 1 further comprising an auxiliary electronic memory device arranged on each said sleeve, said characteristic data being stored on the auxiliary memory device and read into the main memory device at the time of storage.

26. A system as in claim 25 further comprising a main data exchange device by means of which the characteristic data can be read from the auxiliary memory device into the main memory device, and at least one of new characteristic data and changed characteristic data and data from the main memory device can be written and stored on the auxiliary memory device.

27. A system as in claim 26 wherein data is between said auxiliary memory device and said main data exchange device without contact.

28. A system as in claim 25 further comprising a computing and memory device for each printing machine and an auxiliary data exchange device arranged in each printing unit, said characteristic data being read from the main memory device into the computing and memory device by said auxiliary data exchange device, and at least one of new characteristic data and changed characteristic data from the computing and memory device can be written on said auxiliary memory device.

29. A system as in claim 25 further comprising a computing and memory device for each printing machine, said auxiliary memory device providing data exchange between the computing and memory device and the main memory device.

30. A system as in claim 25 wherein each said auxiliary memory device comprises a transponder.

31. A system as in claim 25 further comprising a computing and memory device for each printing machine, and means for determining data about the damage status of the rubber-cover cylinder sleeves and transmitting the data to at least one of the main memory device and the computing and memory devices.

32. A system as in claim 25 further comprising a computing and memory device for each printing machine and a hand-held input device into which data about the damage status of the sleeves can be entered and transmitted to at least one of the main memory device and the computing and memory devices.

33. A system as in claim 1 wherein said main electronic memory device comprises an interface which is accessible from an external location.

34. A system as in claim 33 wherein the characteristic data stored in the main memory device can be called up from the external location via the interface, and new characteristic data can be transmitted into the memory device via the interface and stored.

35. A system as in claim 1 wherein said means for determining suitability for a specific print job comprises means for determining reusability of said sleeves.

* * * * *